(12) United States Patent
Mays, III et al.

(10) Patent No.: US 11,403,064 B2
(45) Date of Patent: Aug. 2, 2022

(54) CONTENT CAPTURE EXPERIENCES DRIVEN BY MULTI-MODAL USER INPUTS

(71) Applicant: Microsoft Technology Licensing, LLC, Redmond, WA (US)

(72) Inventors: Eddie Louis Mays, III, Maple Valley, WA (US); Hauke Antony Gentzkow, Seattle, WA (US); Austin Seungmin Lee, Seattle, WA (US); Alice Shirong Ferng, Bellevue, WA (US); Aaron David Rogers, Washington, UT (US); Lauren Diana Lo, Seattle, WA (US); Cadin Lee Batrack, Seattle, WA (US); Jonathan Reed Harris, Kirkland, WA (US); Brian Scott Stucker, Redmond, WA (US); Becky Ann Brown, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/684,329

(22) Filed: Nov. 14, 2019

(65) Prior Publication Data
US 2021/0149625 A1    May 20, 2021

(51) Int. Cl.
| | | |
|---|---|---|
| *G06F 3/16* | (2006.01) | |
| *G06F 9/451* | (2018.01) | |
| *G06F 3/04817* | (2022.01) | |
| *G06F 3/0486* | (2013.01) | |
| *G06F 3/04883* | (2022.01) | |
| *G10L 15/22* | (2006.01) | |
| *G10L 15/26* | (2006.01) | |

(52) U.S. Cl.
CPC .......... *G06F 3/167* (2013.01); *G06F 3/0486* (2013.01); *G06F 3/04817* (2013.01);
(Continued)

(58) Field of Classification Search
CPC .......... G06F 3/033; G06F 3/038; G06F 3/048; G06F 3/167; G06F 3/0486; G06F 9/451;
(Continued)

(56) References Cited

U.S. PATENT DOCUMENTS

| | | |
|---|---|---|
| 8,487,888 B2 | 7/2013 | Wigdor et al. |
| 9,417,701 B2 | 8/2016 | Rimas Ribikauskas et al. |

(Continued)

FOREIGN PATENT DOCUMENTS

| | | |
|---|---|---|
| CN | 102037451 A | 4/2011 |

OTHER PUBLICATIONS

Zibreg, Christian, "Boosting iPad Productivity With One-Fingered App Switching & Other Multitasking Gestures", Retrieved From: https://www.idownloadblog.com/2018/06/12/ipad-multitasking-gestures-ios-12-tutorial/, Jun. 12, 2018, 17 Pages.

(Continued)

*Primary Examiner* — Pei Yong Weng

(57) ABSTRACT

Systems, methods, and software are disclosed herein for enhancing the content capture experience on computing devices. In an implementation, a combined user input comprises a voice signal and a touch gesture sustained at least partially coincident with the voice signal. An occurrence of the combined user input triggers the identification of an associated content object which may then be associated with a captured version of the voice signal. Such an advance provides users with a new framework for interacting with their devices, applications, and surroundings.

21 Claims, 14 Drawing Sheets

(52) U.S. Cl.
CPC .......... *G06F 3/04883* (2013.01); *G06F 9/451* (2018.02); *G10L 15/22* (2013.01); *G10L 15/26* (2013.01); *G10L 2015/223* (2013.01)

(58) Field of Classification Search
CPC . G06F 3/04817; G06F 3/04883; G10L 15/26; G10L 15/22; G10L 2015/223
See application file for complete search history.

(56) References Cited

U.S. PATENT DOCUMENTS

| | | |
|---|---|---|
| 9,575,646 B2 | 2/2017 | Forstall et al. |
| 9,727,235 B2 | 8/2017 | Cromer et al. |
| 2007/0100635 A1* | 5/2007 | Mahajan ................. G10L 15/22 704/276 |
| 2009/0251441 A1* | 10/2009 | Edgecomb .......... G06F 3/04883 345/179 |
| 2013/0019175 A1* | 1/2013 | Kotler ................ G06F 3/04886 715/728 |
| 2014/0173529 A1 | 6/2014 | Hicks |
| 2016/0124706 A1 | 5/2016 | Vasilieff et al. |
| 2017/0255445 A1* | 9/2017 | Seolas ..................... G06F 40/40 |
| 2019/0087205 A1 | 3/2019 | Guday |
| 2019/0171352 A1* | 6/2019 | Shibata .............. G06K 9/00402 |

OTHER PUBLICATIONS

"International Search Report and Written Opinion Issued in PCT Application No. PCT/US20/057583", dated Feb. 17, 2021, 10 Pages.

\* cited by examiner

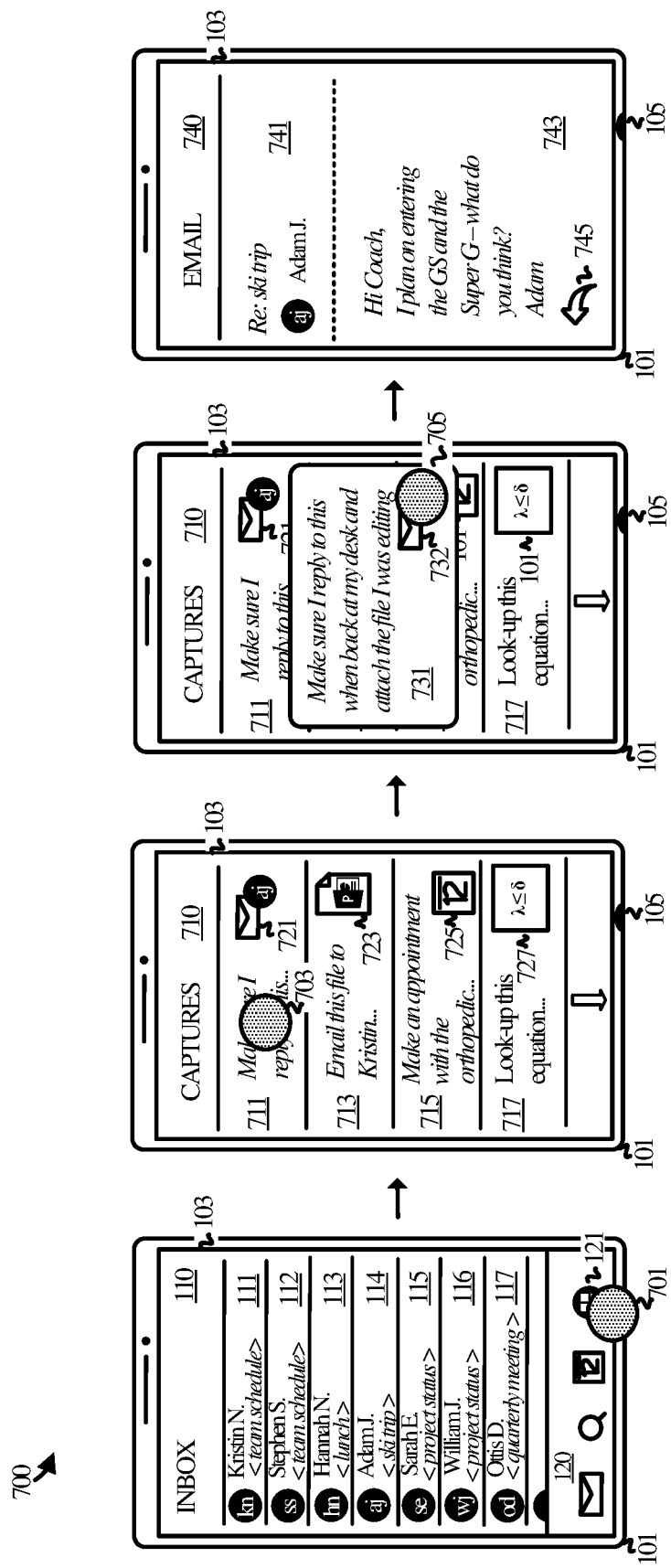

CONTENT CAPTURE EXPERIENCES DRIVEN BY MULTI-MODAL USER INPUTS

TECHNICAL FIELD

Aspects of the disclosure are related to the fields of computing devices and software applications, and in particular, to enhanced content capture experiences driven by multi-modal user inputs.

TECHNICAL BACKGROUND

Modern computing devices support a variety of user input modalities such as voice control and spatial gesturing, in addition to traditional touch and keyboard-based input modes. While a vast improvement over the options of the past, the same general framework persists where one modality is utilized at a time to control events.

As an example, many devices in the marketplace today support the voice invocation of digital assistants. Users can interact with digital assistants in a conversational manner by speaking a digital assistant's name followed by a command or request. In another example, spatial gestures made with a device (e.g. making a particular motion with a phone) can be used to unlock the device, control a video game, or the like.

The content capture experience has likewise been improved by the advent of new input modalities. Users can reliably generate content using the speech-to-text transcription capabilities of many applications and devices, as well as their handwriting recognition capabilities coupled with digital inking implements.

Nevertheless, the single-modality framework relegates the user to supplying input by one modality or another: a user is either speaking to a device or using touch or spatial gestures; typing on a keyboard or inking with a stylus. Such a framework limits the creative capacity of developers to continue to improve the user experience.

Some frameworks do utilize multiple modes of user input at the same time, but not to control events. For example, some messaging applications include a feature whereby users can hold down a button while speaking, in order to make a recording of their voice which can be sent to a recipient in a text message. The first modality in this example is touch, while the second modality is voice, although it is the touch that controls events—the recording is just content.

Overview

Technology disclosed herein relates to a new multi-mode user input framework that enhances the user experience with respect to the content capture capabilities of computing devices and applications. In an implementation, a combined user input comprises a voice signal and a touch gesture sustained at least partially coincident with the voice signal. An occurrence of the combined user input triggers the identification of an associated content object which may then be associated with a captured version of the voice signal. Such an advance provides users with a new framework for interacting with their devices, applications, and surroundings.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, like reference numerals in the drawings designate corresponding parts throughout the several views. While several embodiments are described in connection with these drawings, the disclosure is not limited to the embodiments disclosed herein. On the contrary, the intent is to cover all alternatives, modifications, and equivalents.

FIG. 7 illustrates an operational scenario with respect to captured inputs in an implementation of combined inputs.

DETAILED DESCRIPTION

Figure 1:
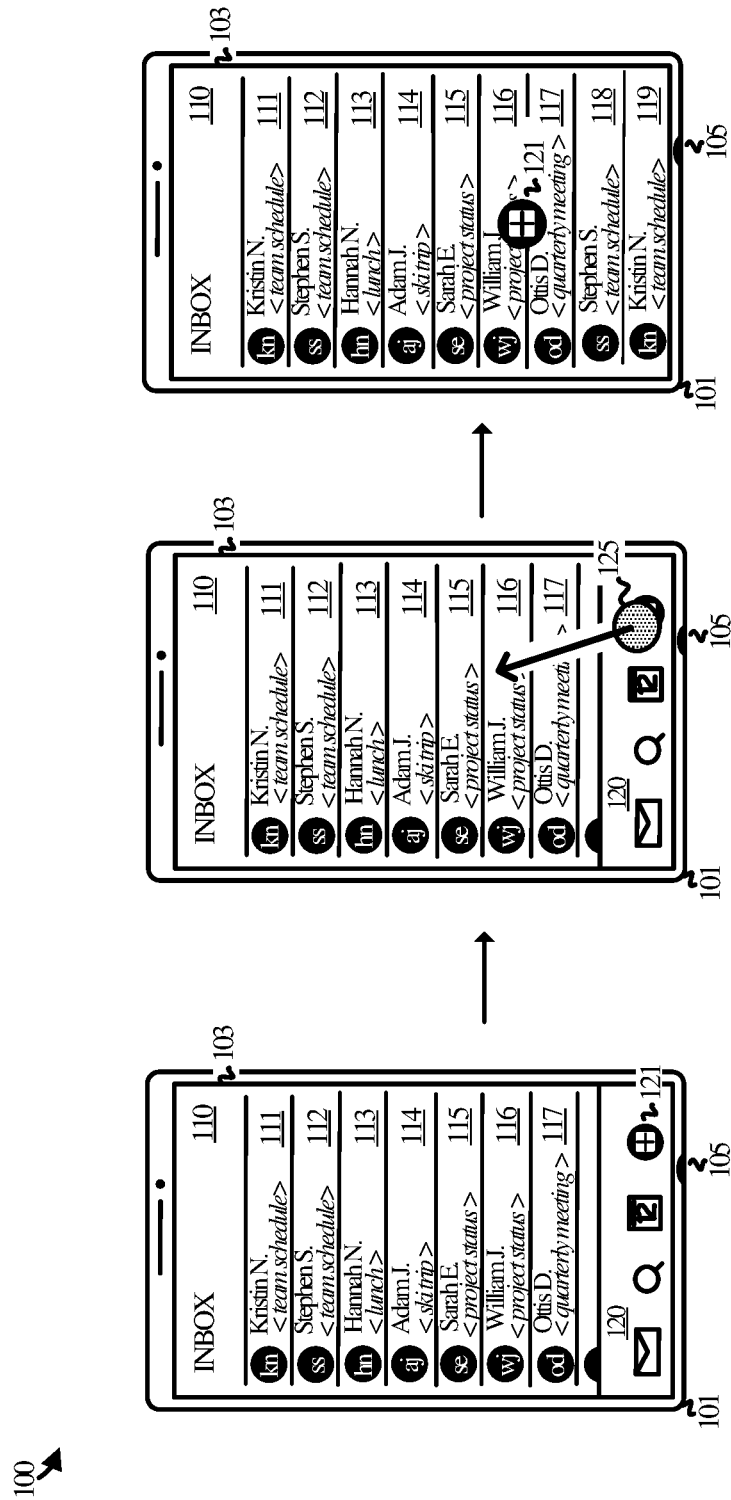
FIG. 1 illustrates an operational scenario in an implementation of combined inputs.

A new multi-input mode framework is disclosed herein that allows users to enter and exit a multi-input mode paradigm that, when engaged, allows the users to control the content capture experience by a combination of user inputs. The multi-input mode may be selectively engaged by the user, although it may be provided in some cases as the default mode of operation. In other cases, multi-input mode may be one of two or more supported frameworks on a device or alternatively it may be the only framework supported on a device.

The multi-input mode framework centers on the concept of combined user inputs. A combined user input comprises a voice signal and a touch gesture sustained at least partially coincident with the voice signal. An occurrence of a combined user input triggers the identification of an associated content object. The content object may then be associated with a captured version of the voice signal such as an audio and/or video recording, a transcription, or the like, such that the content object and a representation of the voice signal can be presented and accessed together.

In some implementations, a combined object may be produced that associates the captured version of the voice signal with the content object voice object and that can be displayed or otherwise presented to the user. The captured version of the voice signal can be stored in association with the content object targeted by a touch gesture. In some cases, a single file structure holds both the captured version of the voice and the content object, whose data types may differ. In other cases, the file structure includes meta data that points to or otherwise references one or both of the captured voice and the content object.

Examples of content objects include but are not limited to individual emails, documents, calendar events, screen captures, images, and videos. Examples of captured versions of the voice signals include but are not limited to transcriptions of spoken utterances encoded in the voice signals, audio or video recordings of voice signals, and the like.

As mentioned, the captured versions of the voice signals may be transcriptions of utterances encoded in the voice signals. In some scenarios, the transcriptions of the utterances in no association with any other objects. That is, just the transcription may be stored such that a user may later consult what was said. The transcription may be stored in the context of an application that allows the user to browse both stand-alone transcriptions (such as the one just described), as well as those stored in association with other objects (as described above).

Combined user inputs may be detected by monitoring for them when in a multi-input mode, as opposed to when not in a multi-input mode. If a given environment is always in a multi-input mode, then the monitoring may be continuous—or nearly so. The multi-input mode may be entered into via a selection or command in a user interface to an environment. For example, the selection of the multi-input mode may be a touch-and-drag gesture made with respect to an icon associated with the multi-input mode. The gesture "drags" the icon from an initial position to a position on a content canvas in the user interface. Press-and-hold gestures made with respect to the same icon when in the initial position, generate captured versions of voice signals that are received coincident with the press-and-hold gestures.

In some scenarios, a slide gesture made with the icon transitions the user experience from one application to another while in the multi-input mode. As an example, a user browsing email may select an email for voice annotation, which causes a "listening" window to surface. In this example, the listening graph includes a button for launching the camera application. The user can slide the multi-input icon onto the camera button which causes the camera application to load in the user interface—in the multi-input mode. The user may then proceed to annotate images and/or video captured by the camera.

Referring now to the drawings, FIG. 1 illustrates an operational scenario 100 in an implementation of combined user inputs. Operational scenario 100 relates to computing device 101, examples of which include—but are not limited to—mobile phones, tablet computers, laptop computers, desktop computers, wearable devices (e.g. watches), and any other computing devices, combination of devices, or variation thereof. Computing device 101 may be implemented in accordance with any suitable computing architecture of which the architecture of computing device 600 in FIG. 6 is representative.

Computing device 101 includes one or more user interface devices, systems, or sub-systems through which a user may interact with software and services running on the device. Examples include display 103 and microphone 105.

Operational scenario 100 begins with an inbox 110 and feature menu 120 displayed on display 103. Inbox 110 is representative of a screen presented by a personal information management application for users to view the contents of the email, e.g. email 111, 112, 113, 114, 115, 116, and 117. A personal information management application (e.g. an email application) is illustrated for exemplary purposes, although it may be appreciated that the concepts disclosed herein with respect to combined user input apply to any other applications.

Feature menu 120 includes various options for navigating to different parts or features of the application such as a compose mail option, a search option, and a calendar option. Feature menu 120 also includes an option for transitioning to multi-input mode, represented by capture button 121. Capture button 121 comprises an icon and associated controls that respond to various user inputs to drive the behavior of the application.

For instance, touch and dragging capture button 121 via user input 125 onto the content canvas of inbox 110 (or the content canvas of any other application) triggers the application to transition to multi-input mode. Feature menu 120 disappears from display 103 upon the transition to multi-input mode, thereby giving the user a visual clue to the modal change. Capture button 121 also lands elsewhere on the content canvas to provide the user with further contextual awareness of the mode.

Figure 2A:
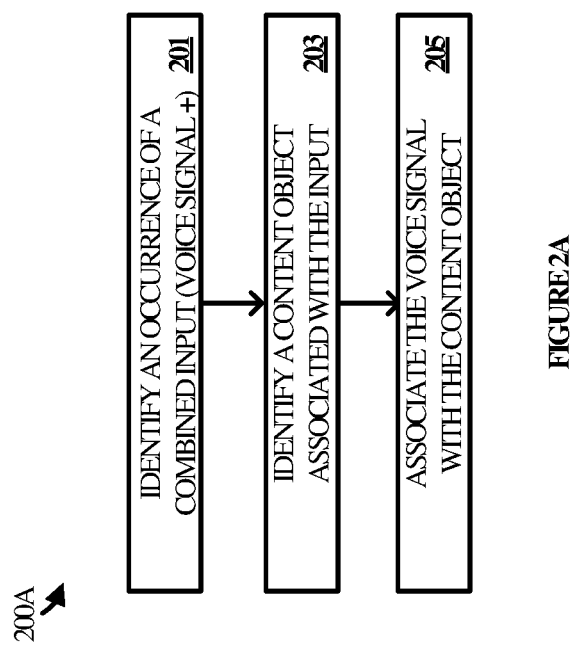
FIG. 2A illustrates a combined input process in an implementation.

Once in the multi-input mode, computing device 101 employs combined input process 200A, illustrated in FIG. 2A, to enhance the user experience. Combined input process 200A may be implemented in program instructions in the context of any of the modules, components, or other such elements of the operating system and/or application(s) supported by computing device 101. The program instructions direct computing device 101 to operate as described for combined input process 200A, referring parenthetically to the steps in FIG. 2A.

To begin, computing device 101 identifies an occurrence of a combined user input (step 201). Examples of combined user inputs include spoken utterances (speech) that are carried by voice signals that occur at least partly coincident with touch gestures, spatial gestures, or the like. While two user inputs are disclosed herein, a combined user input may include more than two user inputs in some implementations (e.g. voice, touch, and spatial inputs).

Next, computing device 101 identifies a content object associated with the combined user input (step 203). This may include, for instance: identifying an email, a document, an object in a photo or video; an image on a page, a paragraph of text, or any other type of content object that is the target of a sustained touch gesture (press and hold).

Having identified the content object, computing device 101 associates the decoded utterance with the content object (step 205). For example, computing device 101 may annotate the content object with the words of the spoken utterance or store an audio recording of the utterance in association with the content object. In another example, a new combined-input object may be created that includes both the content object and the captured version of the utterance. The combined-input object may include meta data that points to both the content object and the captured version of the utterance, although it may also include the actual data for the content object and the utterance. In any case, the content object and captured version of the utterance are associated such that a combination of the two items may be retrieved and presented together in a later context such as an application, a module of an application, or the like.

Figure 2B:
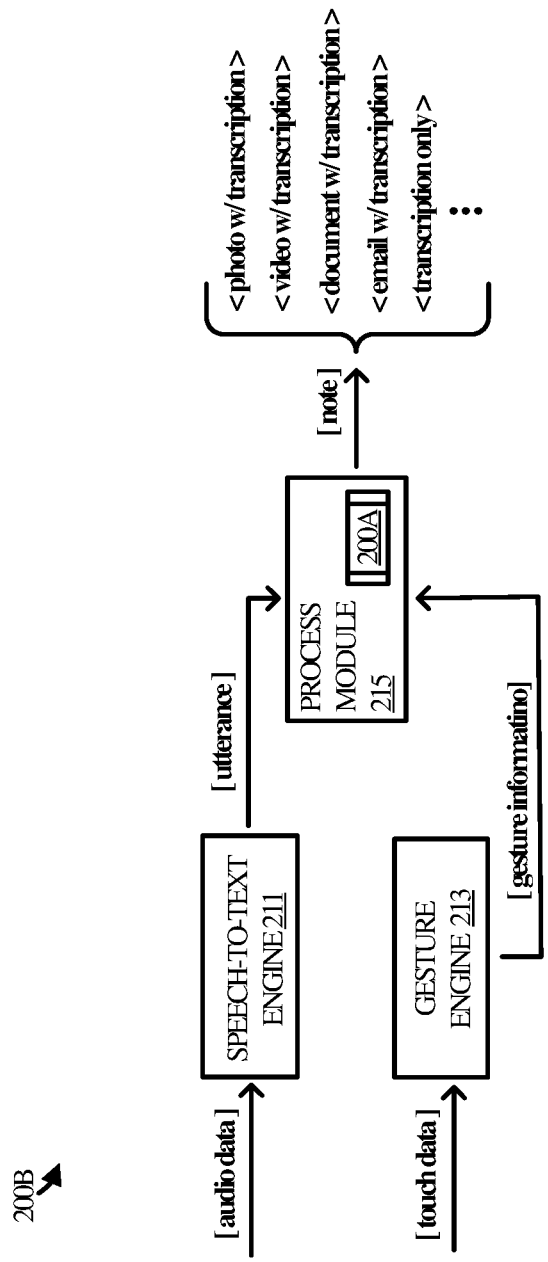
FIG. 2B illustrates a functional architecture for implementing combined inputs.

FIG. 2B illustrates a functional architecture 200B for implementing combined input process 200A. Functional architecture 200B includes speech-to-text engine 211, gesture engine 213, process module 215, which may be implemented in hardware, software, firmware, or any combination thereof. Functional architecture 200B may be implemented on a single device (e.g. computing device 101) or distributed over multiple devices, co-located or remote.

Speech-to-text engine 211 is operatively coupled with process module 215, as is gesture engine 213. In operation, speech-to-text engine 211 receives audio data captured by an audio sub-system of computing device 101. The audio data comprises a symbolic representation of an analog voice signal having a spoken utterance encoded therein. The audio data may be formatted in accordance with any suitable protocol and in an uncompressed or compressed state. Non-limiting examples of such protocols include WAV, PCM, MP3, and MP4. Speech-to-text engine 211 analyzes the audio data to identify and extract utterances within the recordings, which may then be provided to process module 215.

Process module 215 also receives gesture information from gesture engine 213. Gesture engine 213 receives touch data from one or more sub-systems of computing device 101 and may itself be comprised of one or more hardware, software, or firmware components. The touch data may indicate a location on a display screen where a user initiated a touch gesture, as well as timing data that indicates the duration of the gesture. Gesture engine 213 uses the touch data to determine whether a content object was the target of a touch gesture and if so—for how long. Gesture engine 213 passes the gesture information to process module 215 for consideration in the context of combined input process 200A.

Process module 215 takes-in the utterances and gesture information from speech-to-text engine 211 and gesture engine 213 respectively and analyzes them—per combined input process 200A—to determine whether a combined user input has occurred that would result in one of several associations of content objects with utterances. For example, process module 215 may determine to associate a photo with a transcription, a video with a transcription, a document with a transcription, or an email with a transcription. In some cases, a combined user input may occur that results in transcription that lacks any association with a content object. Process module 215 produces a note, meta data indicative of a note, or both. The resulting note(s) may be presented in a variety of contexts such as an application for managing and interfacing with a collection of notes.

Figure 2C:
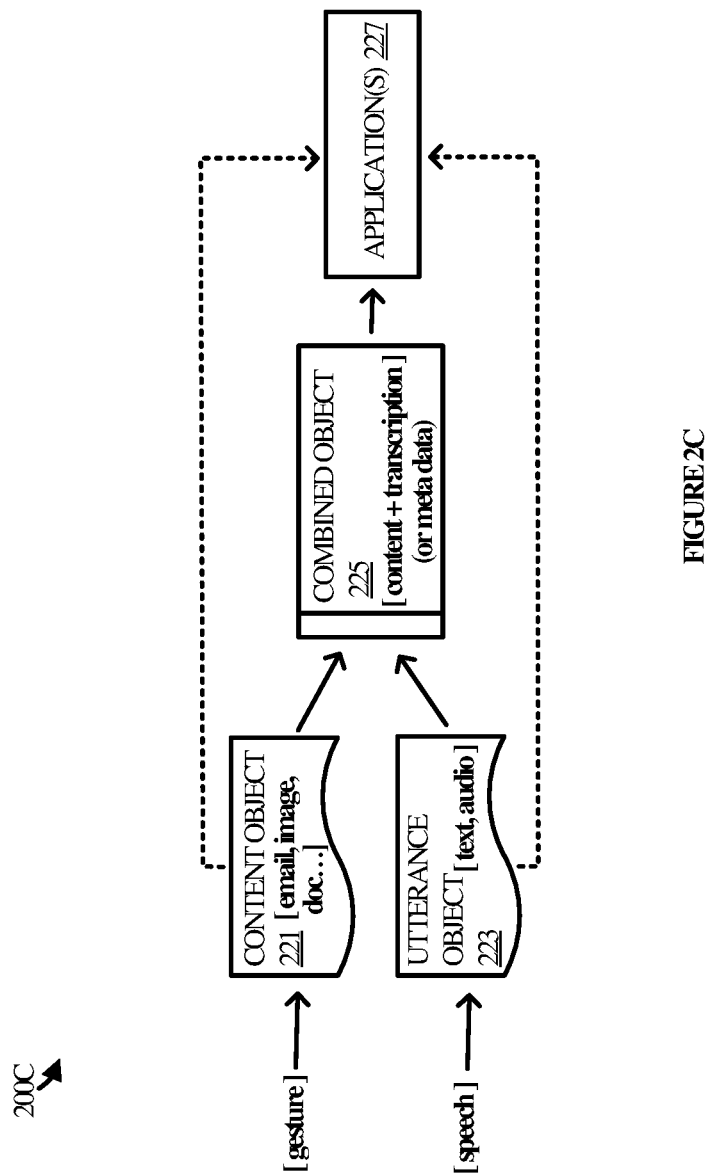
FIG. 2C illustrates an object architecture in an implementation of combined inputs.

FIG. 2C briefly illustrates an object architecture 200C in an exemplary implementation. Object architecture 200C includes content object 221, utterance object 223, combined object 225, and one or more applications, represented by application 227.

Content object 221 represents one or more software objects that underpin a given content item such as an email, an image, or a document. Content object 221 may be the subject or target of a touch gesture in the context of multi-input mode operation.

Utterance object 223 is representative of one or more software objects that form a data representation of a spoken utterance. Utterance object 223 may be, for example, a transcription, a recording, or both.

Combined object 225 represents one or more data structures that combines one or more elements of each of content object 221 and utterance object 223. That is, combined object 225 draws from both of the other objects such that a rendering of combined object 225 by an application would include visual references to both of the other objects.

Application 227 represents any application capable of utilizing combined object 225 and—optionally—content object 221 and utterance object 223. In an example, a combined object may include (or has meta data that points to) the text in an utterance object and a file icon in a content object, in addition to other graphical elements of the combined object itself.

Application 227 would be capable of rendering a visualization of the combined object that includes the text, the file icon, and its other graphical elements (a border, background, etc., which may also be drawn from a graphics library). Application 227 may draw the text and file icon directly from the combined object. Alternatively, the combined object may include meta data that points to the text and/or the file icon, in which case application 227 would draw the text and file icon from the utterance object and the content object themselves.

Figure 3:
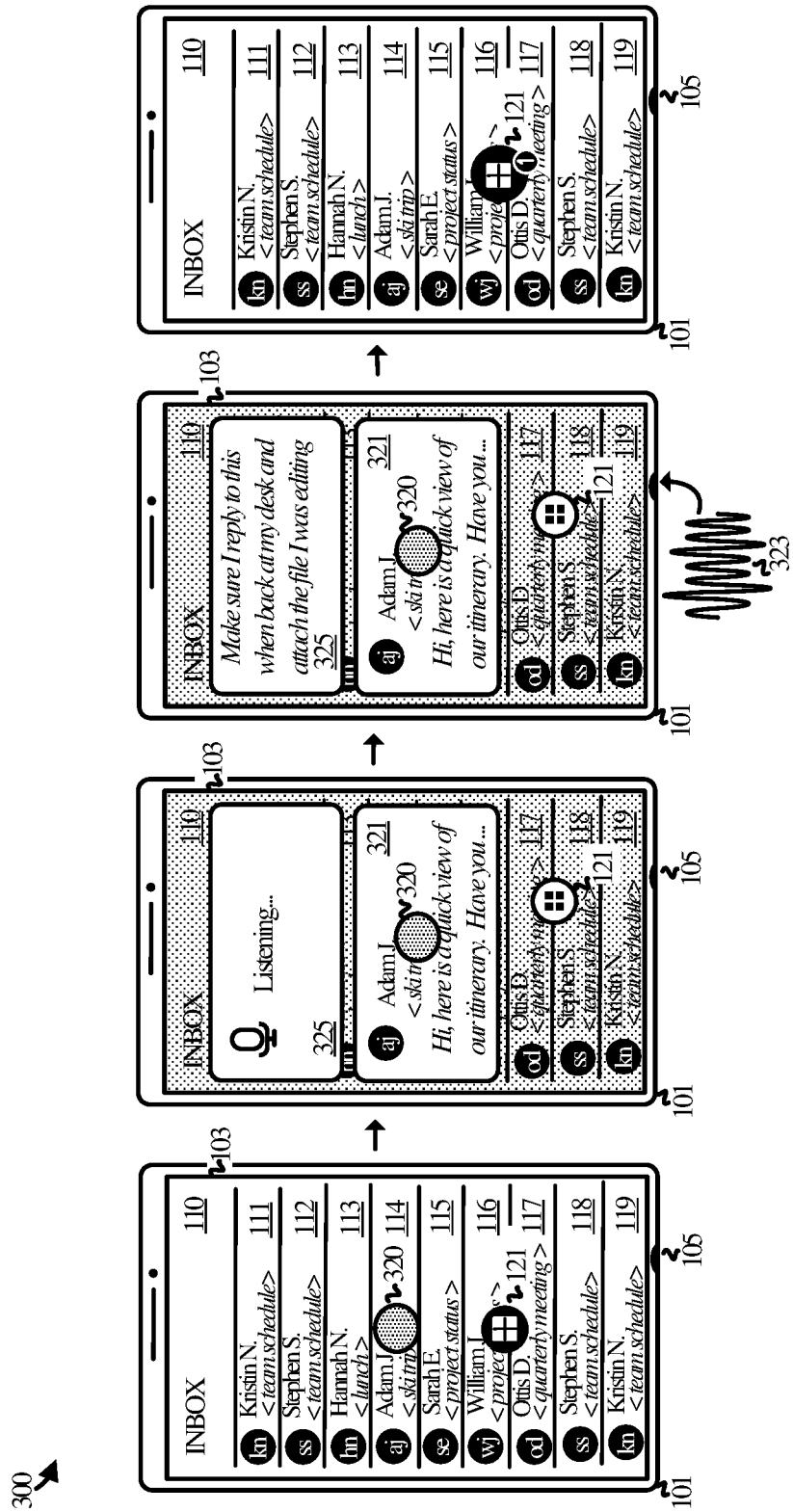
FIG. 3 illustrates an operational scenario in an implementation of combined inputs.

FIG. 3 illustrates an operational scenario 300 in an implementation of combined input process 200 by computing device 101. In operation, computing device 101 has entered into multi-input mode by virtue of a user dragging capture button 121 from feature menu 120 onto the canvas of inbox 110, which includes emails 111-119.

Having entered the device into multi-input mode, the user proceeds to supply user input 320, which is representative of a touch-and-hold gesture. While user input 320 persists, computing device 101 is triggered by the gesture to surface an expanded view 321 of email 114 (i.e. content object). Additionally, computing device 101 surfaces a supplemental window 325 that indicates that the device is listening for voice input coincident with user input 320.

The user proceeds to speak, thereby producing voice signal 323. Microphone 105 receives the voice signal 323, which an audio sub-system on computing device 101 captures and converts to a digital representation. A speech-to-text engine onboard computing device 101 (or possible remote from the device, however unlikely) analyzes the digital representation of voice signal 323 to extract and transcribe one or more utterances carried by the voice signal.

The transcription is surfaced on supplemental window 325 for the user to view. When the user ceases user input 320, a new combined object is produced and supplied to one or more applications for display in a list or in some other context. Capture button 121 is updated on display 103 to indicate that a new combined object has been created and is available. For example, the new combined object may be represented using the metaphor of a note within the context of a note application, a task within a task application, or the like. Updating capture button 121 provides the user with a visual hint that the note has been persisted to the application.

Figure 4:
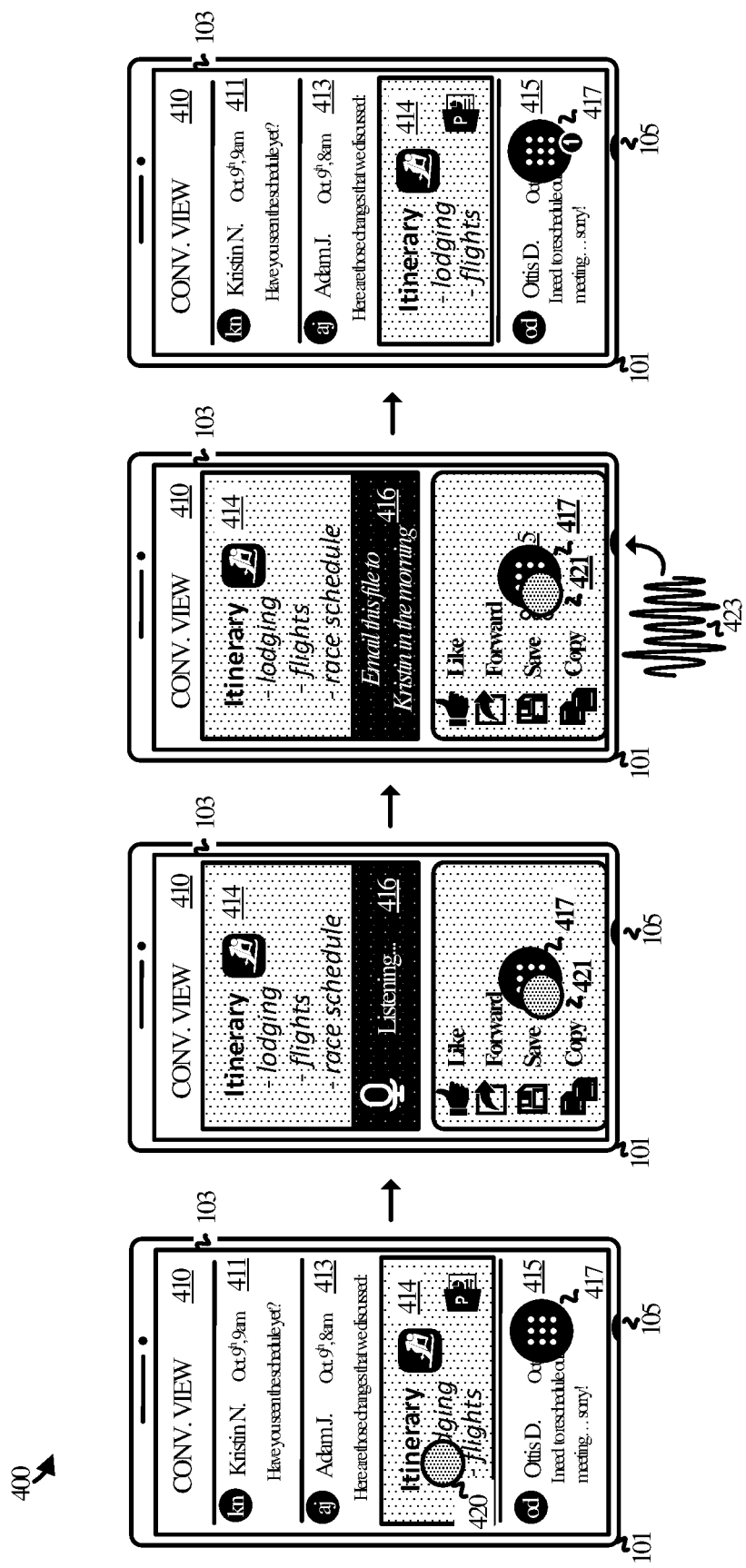
FIG. 4 illustrates an operational scenario in an implementation of combined inputs.

FIG. 4 illustrates another operational scenario 300 in an additional implementation of combined input process 200. In operation, computing device 101 has again entered into multi-input mode, but this time within the context of a messaging, conversation, or other such collaboration and communication application or tool.

Capture button 417 in this scenario resides above a conversation view 410 of the various messages or conversations carried on via the application or tool. For example, conversation view 410 includes conversation 411, conversation 413, and conversation 415. Conversation 413 includes a preview 414 of a document (e.g. a presentation deck) that was attached to or otherwise referenced in the conversation. The user may expand the preview 414 of the document by supplying user input 420 such as a touch gesture, a spoken command, a mouse click, or the like.

While the preview 414 is displayed in its expanded state, the user proceeds to supply user input 421, which is a touch-and-hold gesture made with respect to capture button 417. User input 421 causes a window 416 to surface in association with the preview 414, to give the user the indication that the device is monitoring for the user to speak.

While the user continues to touch-and-hold capture button 121, the user begins to speak, producing voice signal 423. Computing device 101 captures voice signal 423 and transcribes an utterance encoded in the signal. The utterance then surfaces in window 416. The user may then release capture button 417 which stops the transcriptions process and returns preview 414 to its original state. In addition, a combined object is created from all or portions of the transcribed utterance and the document and capture button 417 is updated to reflect that a new object has been created and persisted.

Figure 5A:
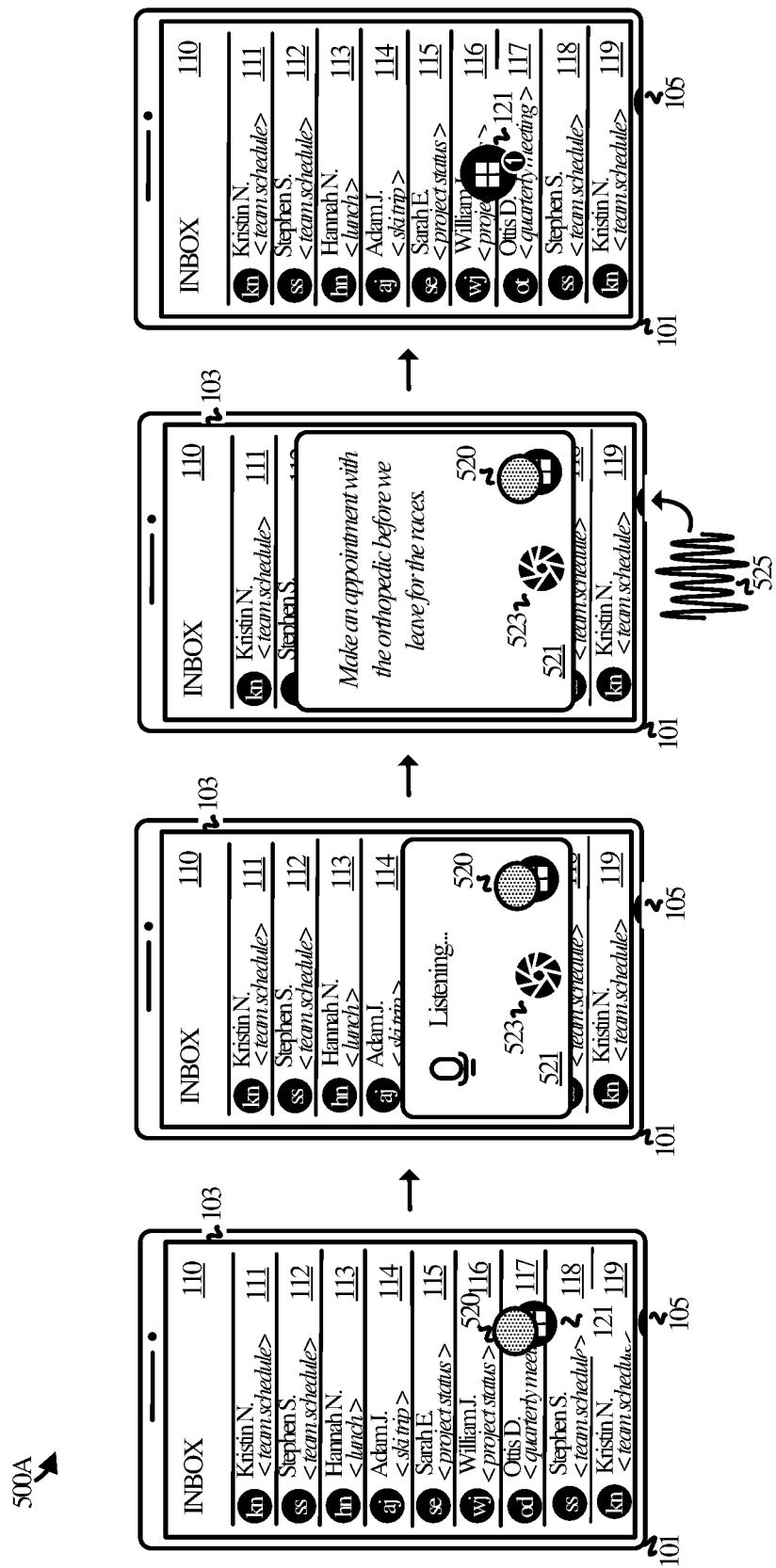
FIGS. 5A-5B illustrate another operational scenario in an implementation.
Figure 5B:
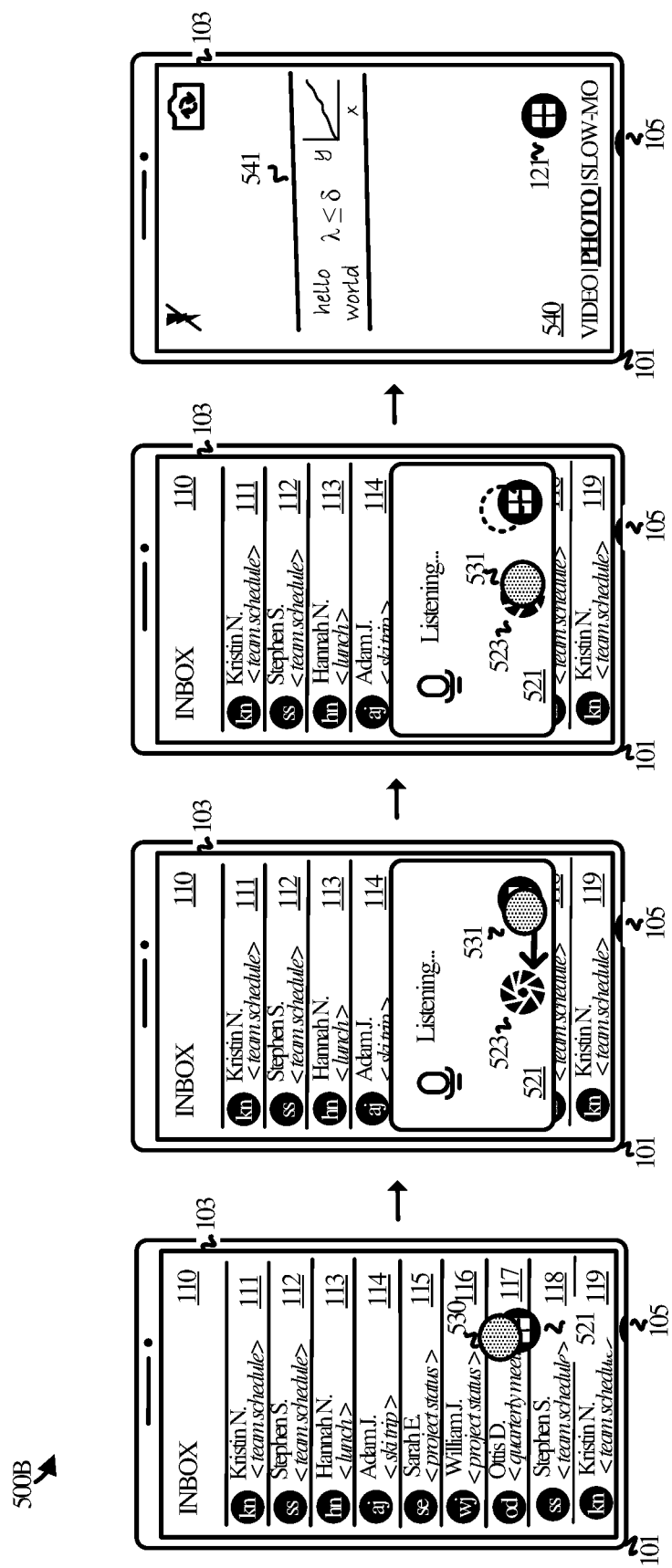

In FIGS. 5A-5B, two variations on an implementation of combined user input are illustrated. In operational scenario 500A, user input 520 comprises a touch-and-hold gesture made with respect to capture button 121. That is, the user presses and holds capture button 121, as opposed to touching one of the emails in inbox 110. User input 520 causes computing device 101 to surface window 521. Window 521 includes the same capture button as well as a camera icon 523.

In operational scenario 500A, the user proceeds to maintain user input while also speaking into microphone 105. Microphone 105 captures voice signal 525 which is decoded and analyzed for a spoken utterance. A transcription of the utterance surfaces in window 521. Once the user ceases user input 520, the transcription of the utterance is made available to one or more applications and capture button 121 is updated to reflect the recent addition of the transcription to a collection of notes, tasks, or other such items accessible through an application that may be reached by selecting capture button 121.

Operational scenario 500B, illustrated in FIG. 5B, gives an alternative example whereby the user navigates to the camera function or application on computing device 101. The again provides a user input 530 comprises a touch-and-hold gesture made with respect to capture button 121. User input 530 brings up window 521, which includes the same capture button as well as a camera icon 523. However, rather than maintaining the touch-and-hold gesture, the user performs a new gesture 531 by sliding the touch point onto camera icon 523.

Sliding the touch point to camera icon 523 causes display 103 to transition to a view 540 provided by a camera application, function, feature, or the like. View 540 includes an image of whatever scene is presently in-view of the camera lens of computing device 101. The scene in this example is of a white board with various notes scrawled on its canvas. View 540 also includes capture button 121 hovering over the canvas of the view. The user may proceed to take a photo, change to a video or slow-motion mode, or—as described with respect to FIGS. 6A-6C utilize combined user input to enhance the content capture experience.

Figure 6A:
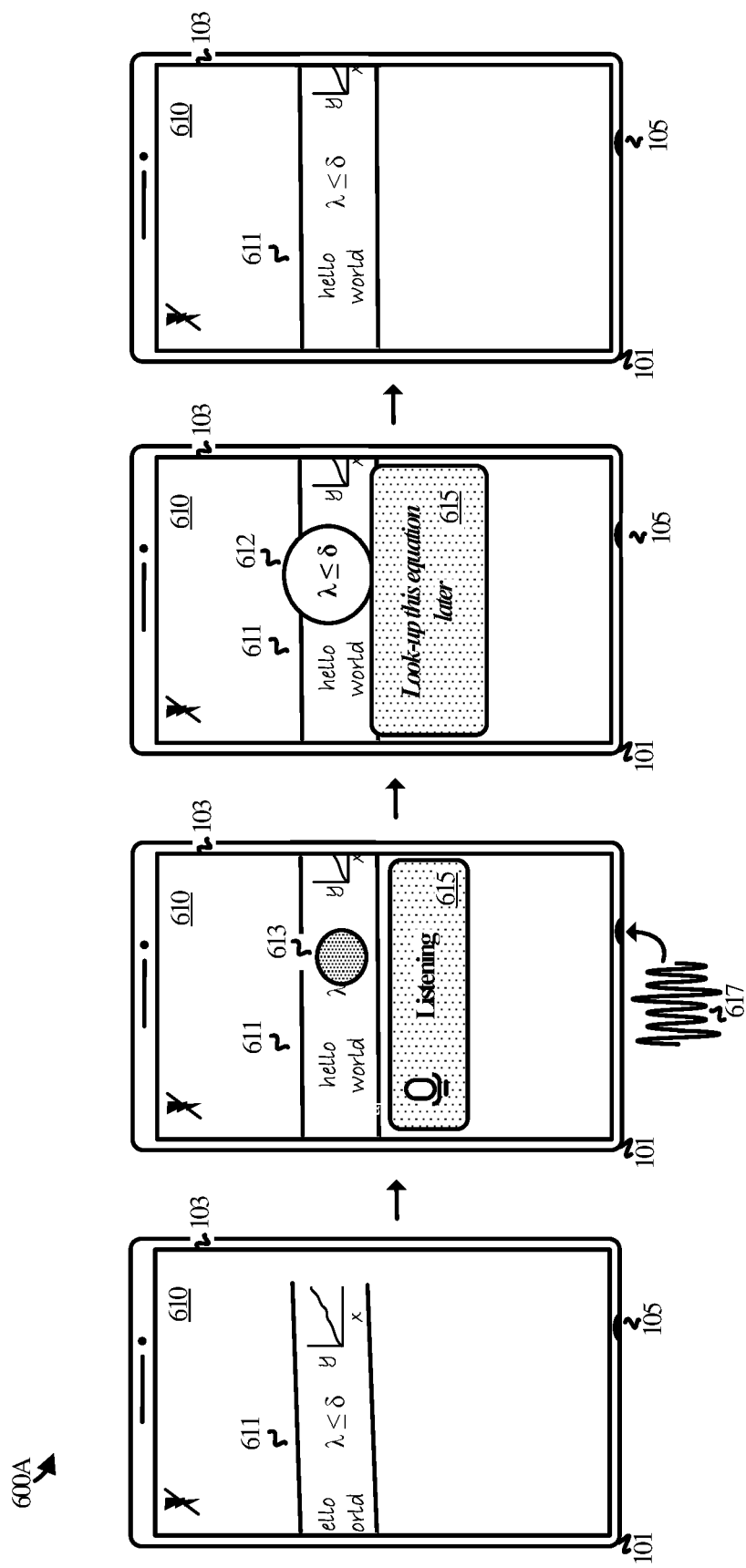
FIGS. 6A-6C also illustrate an operational scenario in an implementation.

FIG. 6A illustrates operational scenario 600A in which display 103 presents a view 610 supplied by a camera application. View 610 includes an image of scene 611 taken in by the camera lens and sub-system of computing device 101. Scene 611 includes a whiteboard with various notes, symbols, and graphs written on it.

The user proceeds to pan the camera to the left such that the left-most part of the whiteboard in view 610 comes into full view while the right-most portion slides partially out of view. The user then supplies user input 613 (a touch-and-hold gesture) on an area of scene 611 that includes an exemplary formula. The gesture causes window 615 to surface on display 103.

While maintaining user input 613, the user vocalizes an utterance which is carried by voice signal 617 and received by microphone 105. A speech-to-text engine on computing device 101 extracts the utterance from a digital representation of the signal and transcribes the utterance into text. Computing device 101 then displays the text within window 615.

Once the user releases the touch-and-hold gesture, a sub-view 612 of the region of interest in scene 611 that was the target of user input 613 is displayed over the scene. The image (or sub-image) that is used to create the sub-view 612 is a content object which may then be merged with the transcription to form a new combined object. The new combined object may be stored in association with the other such notes and tasks. Window 615 and sub-view 612 disappear from view 610 upon subsequent user input, a timer expiring, or the like.

Figure 6B:
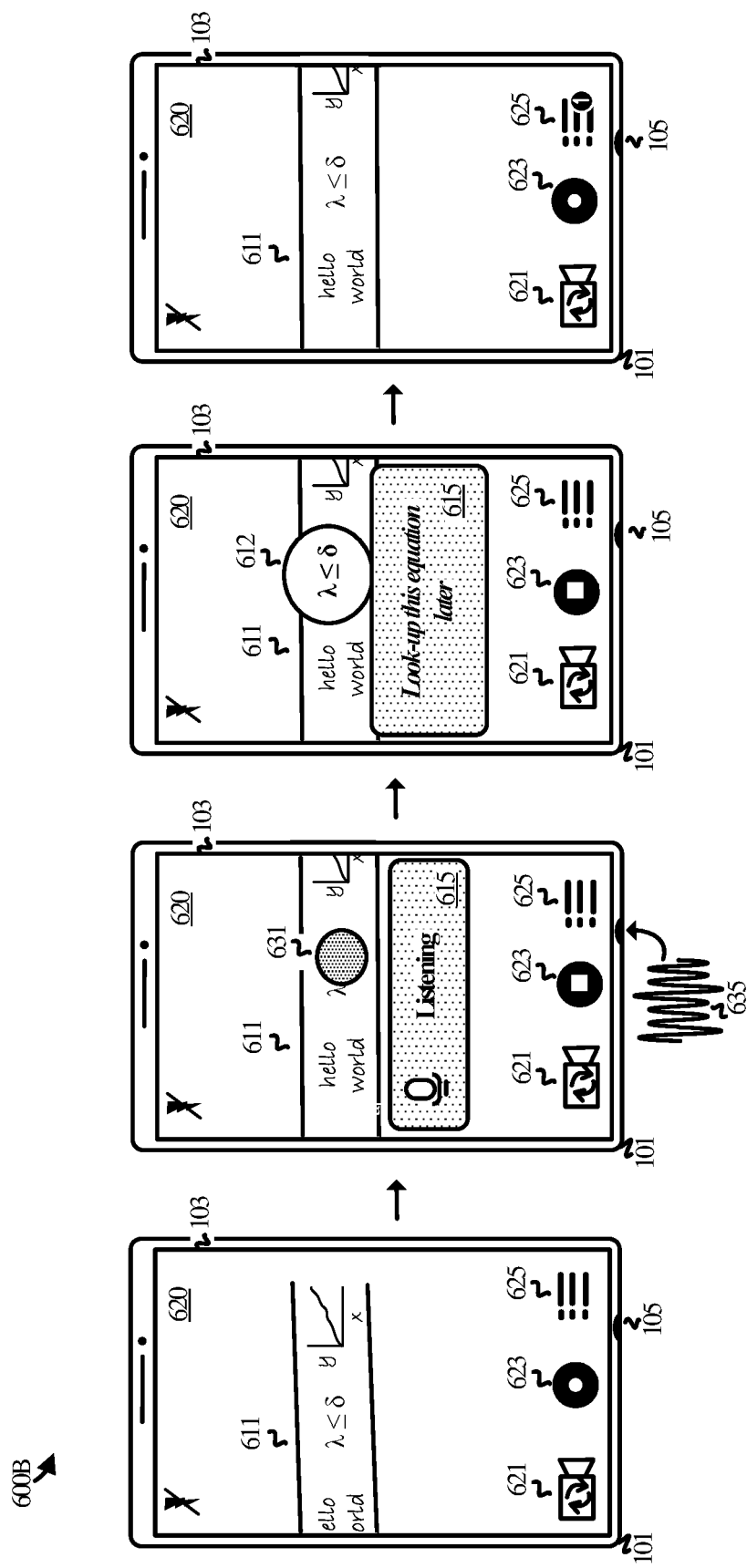

FIG. 6B illustrates operational scenario 600B in which display 103 presents a view 620 of video supplied by a camera application. View 620 includes an image of scene 611 captured by the camera lens and sub-system of computing device 101. As mentioned, scene 611 includes a whiteboard with various notes, symbols, and graphs written on it. View 620 includes a button 621 to change view 620 from an outward perspective to a self-facing perspective. Button 623 allows the user to start and stop recording. View 620 also includes capture button 625 that would navigate the user to a sift application where combined objects may be consumed.

In operation, the user proceeds to pan the camera to the left such that the left-most part of the whiteboard in view 610 comes into full view while the right-most portion slides partially out of view. The user then supplies user input 631 (a touch-and-hold gesture) on an area of scene 611 that includes the exemplary formula. The gesture again causes window 615 to surface on display 103.

While maintaining user input 631, the user vocalizes an utterance which is carried by voice signal 635 and received by microphone 105. A speech-to-text engine on computing device 101 extracts the utterance from a digital representation of the signal and transcribes the utterance into text. Computing device 101 then displays the text within window 615.

Once the user releases the touch-and-hold gesture, the sub-view 612 of the region of interest in scene 611 that was the target of user input 631 is displayed over the scene. The image (or sub-image) that is used to create the sub-view 612 is a content object which may then be merged with the transcription to form a new combined object. The new combined object may be stored in association with the other such notes and tasks. Window 615 and sub-view 612 disappear from view 620 upon subsequent user input, a timer expiring, or the like.

In addition, capture button 625 is updated to indicate that a new combined object (e.g. a note or task) is available via the sift application. The user can touch, click-on, or otherwise select capture button 625 to navigate to the application and/or list of objects. The combined object in this example would be comprised of the transcription of the utterance in voice signal 635 and the image(s) used to populate sub-view 612.

Figure 6C:
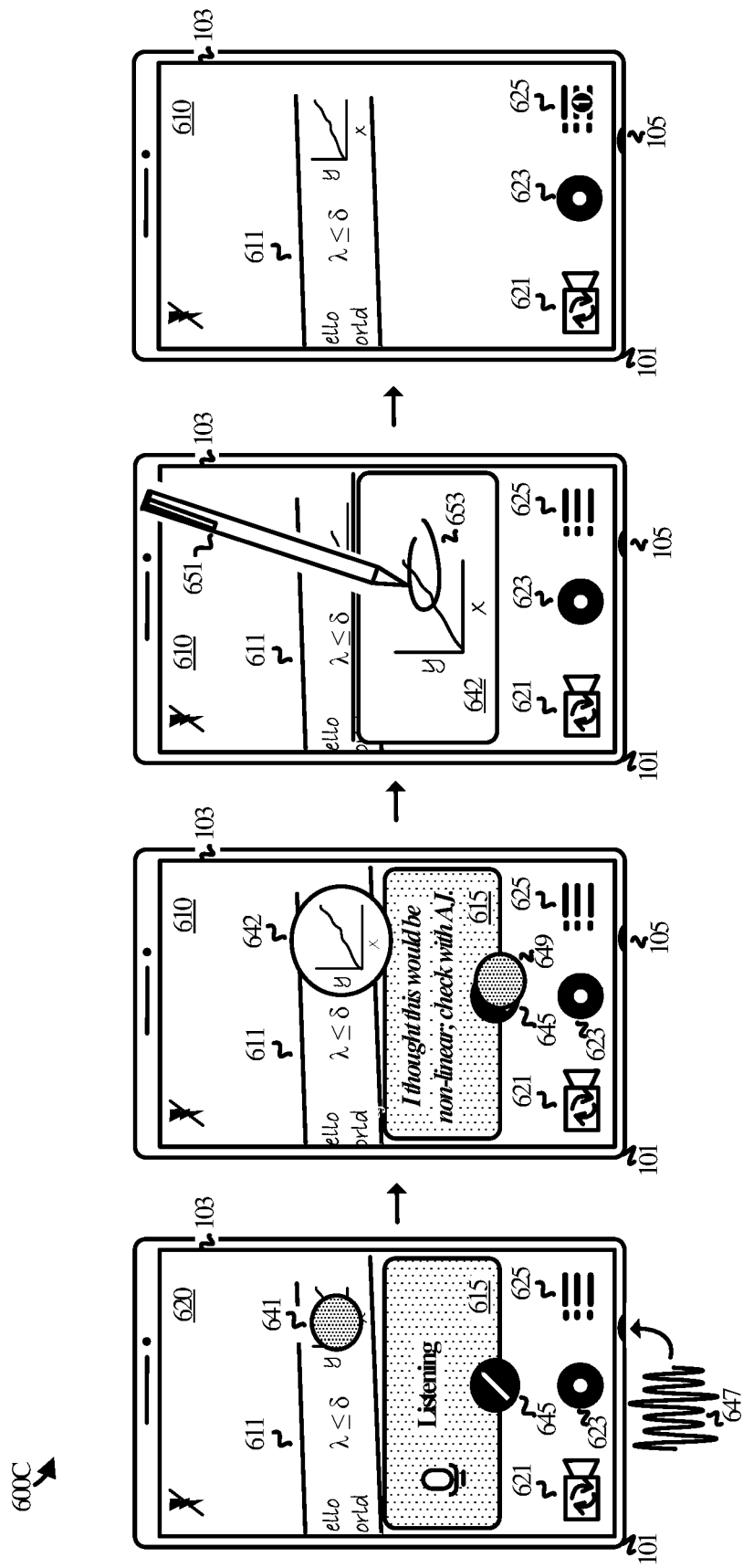

Operational scenario 600C in FIG. 6C illustrates a user experience in which display 103 again presents view 620 of video supplied by a camera application. View 620 includes an image of scene 611 captured by the camera lens and sub-system of computing device 101. As mentioned, scene 611 includes a whiteboard with various notes, symbols, and graphs.

In operation, he user then supplies user input 641 (a touch-and-hold gesture) on an area of scene 611 that includes an exemplary graph or chart. The gesture again causes window 615 to surface on display 103.

While maintaining user input 641, the user vocalizes an utterance which is carried by voice signal 647 and received by microphone 105. A speech-to-text engine on computing device 101 extracts the utterance from a digital representation of the signal and transcribes the utterance into text. Computing device 101 then displays the text within window 615. Once the user releases the touch-and-hold gesture, a sub-view 642 of the region of interest in scene 611 that was the target of user input 641 is displayed over the scene.

Window 615 in this scenario includes an inking button 645 that, when selected, allows the user to annotate images with digital ink. User input 649 (e.g. a touch gesture) made with respect to inking button 645 causes window 615 to recede or disappear, to be replaced by an expanded version of sub-view 642 on which the user may ink with a digital inking implement 651. The user provides digital ink 653 on the graph in sub-view 642. The digital ink 653 is persisted to a combined object along with the image (or sub-image) that is used to create the sub-view 642 and the transcription of the utterance in voice signal 647.

The new combined object may be stored in association with other such notes and tasks. Sub-view 642 disappears from view 620 upon subsequent user input, a timer expiring, or the like. In addition, capture button 625 is updated to indicate that a new combined object is available via the sift application. The user can touch, click-on, or otherwise select capture button 625 to navigate to the application and/or list of objects.

FIG. 7 illustrates operational scenario 700 in an implementation of a capture application. In operational scenario 700, a view of inbox is displayed on display 103. The user supplies user input 701 with respect to capture button 121 to navigate to captures view 710. While illustrated with respect to inbox 110, in may be appreciated that the user could navigate to captures view 710 from anywhere capture button 121 may reside or via other actions such as selecting a captures icon to launch the captures application.

Captures view 710 includes all of the combined objects captured in the preceding operational scenarios. For example, captures view 710 includes combined object 711 created by the combination of a transcribed voice annotation (transcription) and email content in operational scenario 300. Combined object 713 includes the combination of the transcription and document in operational scenario 400. Combined object 715 includes the transcription captured in operational scenario 500A. Lastly, combined object 717 includes the transcription captured in operational scenario 600B, as well as a preview 727 of the image.

Note that combined object 711 includes an email icon 721 which provides a link to the email object associated with the combined object. The user can select email icon 721 to open the associated email.

Combined object 713 includes a document icon 723 that links to the document associated with combined object 713, and combined object 717 includes the preview 727 of its associated image. Document icon 723 can be selected to open the associated document, as can preview 727 to open the associated image.

As an example, user input 703 comprises a selection of combined object 711, causing an expanded view 731 of the combined object to be opened. The expanded view 731 also includes email icon 721. Selecting email icon 721 via user input 705 causes computing device 101 to open email view 740. Email view 740 includes the contents of the associated email such as a subject area 741, a content canvas 743, and a reply button 745.

Note also that combined object 715 includes a calendar icon 725. The calendar icon 725 is present when computing device 101 is able to determine that a given transcription pertained to a schedulable event referenced in the transcribed utterance. For example, computing device 101 in this example recognized the key word "appointment" and can automatically provide a link via calendar icon 725 to create a calendar event.

Additional combined objects may be present but out of view below the bottom of display 103. For instance, the user could navigate to the combined object created in the context of operational scenario 600C. However, users may also access combined objects by other means such as that illustrated in FIG. 8.

Figure 8:
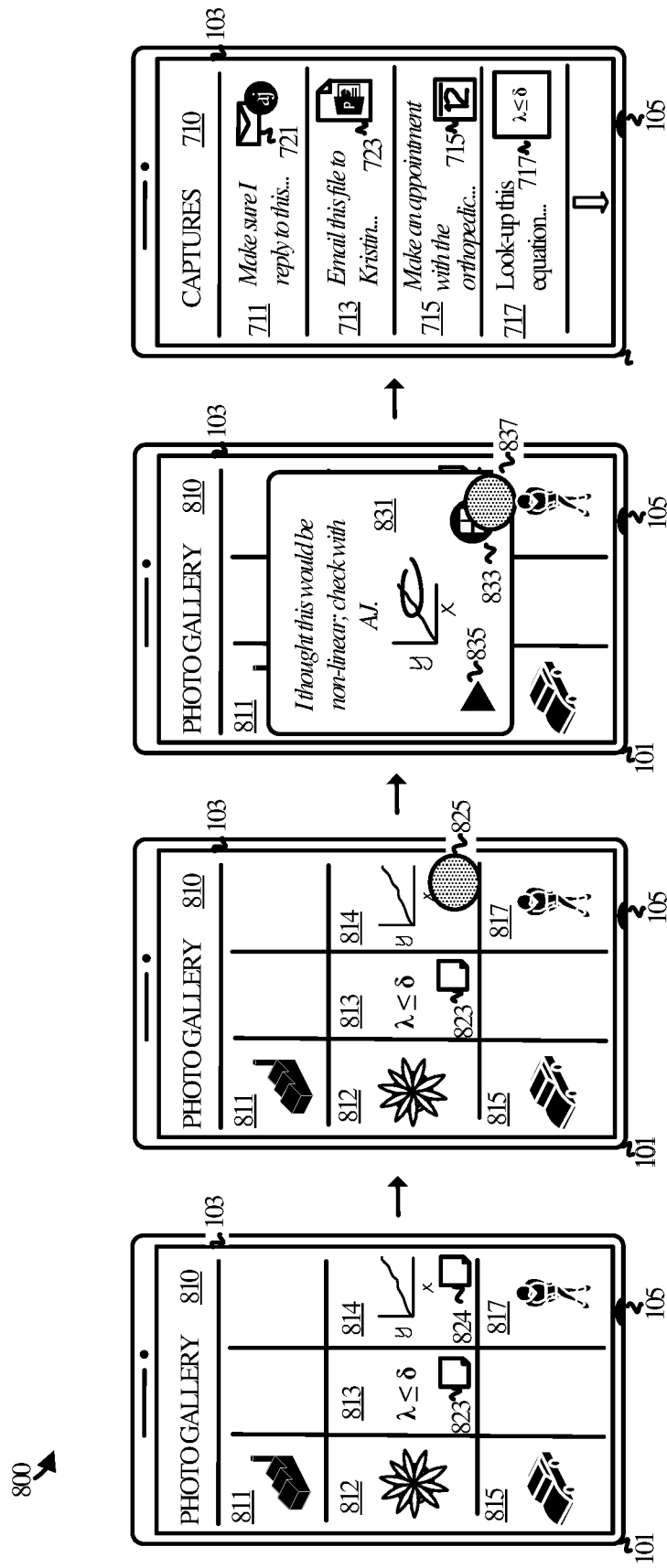
FIG. 8 illustrates another operational scenario with respect to captured inputs in an implementation of combined inputs.

Operational scenario 800 in FIG. 8 pertains to photo gallery 810. Photo gallery 810 includes thumbnails 811, 812, 813, 815, and 817 of photos and/or videos taken with a camera application on computing device 101. For those of the images that were the subject of a combined user input—or otherwise contributed to a combined object—icons embedded or associated with the thumbnails provide a mechanism for navigating to the associated combined objects. For example, thumbnail 813 includes icon 823, and thumbnail 814 includes icon 824. A user may select a given icon to navigate to a corresponding combined object.

For instance, a selection 837 of icon 824 launches the user to a view 831 of the combined object created in the context of operational scenario 600C. View 831 includes the image and inking captured during the scenario, as well as a play button 835 to play out the associated video. View 831 also includes a capture button 833 to navigate to captures view 710. A selection 835 of capture button 833 causes computing device 101 to navigate the user to captures view 710, whereby the user can proceed to view and consume the list of combined objects as discussed with respect to FIG. 7.

Figure 9:
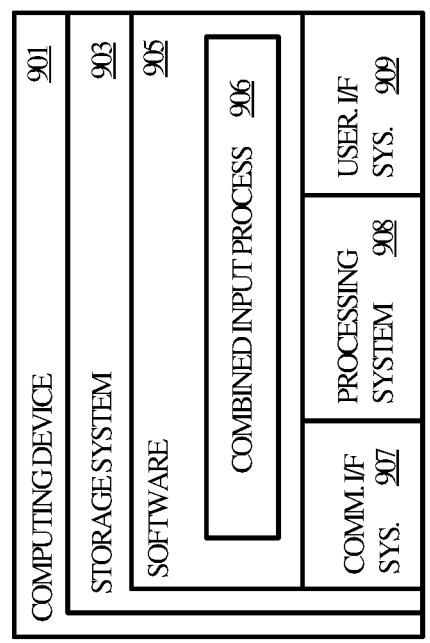
FIG. 9 illustrates a computing system suitable for implementing the various operational environments, architectures, processes, scenarios, and sequences discussed below with respect to the Figures.

FIG. 9 illustrates computing device 901 that is representative of any device or collection of devices in which the various processes, programs, services, and scenarios disclosed herein may be implemented. Examples of computing device 901 include, but are not limited to, mobile phones, tablets, laptops, desktops, watches and other wearable devices, and Internet of Things (IoT) devices. Some or all aspects of the various processes, programs, services, and scenarios disclosed herein may also be implemented on server computers, cloud computing platforms, and data center equipment, as well as any other type of physical or virtual server machine, container, and any variation or combination thereof.

Computing device 901 may be implemented as a single apparatus, system, or device or may be implemented in a distributed manner as multiple apparatuses, systems, or devices. Computing device 901 includes, but is not limited to, processing system 908, storage system 903, software 905, communication interface system 907, and user interface system 909. Processing system 908 is operatively coupled with storage system 903, communication interface system 907, and user interface system 909.

Processing system 908 loads and executes software 905 from storage system 903. Software 905 includes and implements combined input process 906, which is representative of the combined input processes discussed with respect to the preceding Figures. When executed by processing system 908 to enhance the user experience with respect to content capture experiences, software 905 directs processing system 908 to operate as described herein for at least the various processes, operational scenarios, and sequences discussed in the foregoing implementations. Computing device 901 may optionally include additional devices, features, or functionality not discussed for purposes of brevity.

Referring still to FIG. 9, processing system 908 may comprise a micro-processor and other circuitry that retrieves and executes software 905 from storage system 903. Processing system 908 may be implemented within a single processing device but may also be distributed across multiple processing devices or sub-systems that cooperate in executing program instructions. Examples of processing system 908 include general purpose central processing units, graphical processing units, application specific processors, and logic devices, as well as any other type of processing device, combinations, or variations thereof.

Storage system 903 may comprise any computer readable storage media readable by processing system 908 and capable of storing software 905. Storage system 903 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 903 may also include computer readable communication media over which at least some of software 905 may be communicated internally or externally. Storage system 903 may be implemented as a single storage device but may also be implemented across multiple storage devices or sub-systems co-located or distributed relative to each other. Storage system 903 may comprise additional elements, such as a controller, capable of communicating with processing system 908 or possibly other systems.

Software 905 (including combined input process 906) may be implemented in program instructions and among other functions may, when executed by processing system 908, direct processing system 908 to operate as described with respect to the various operational scenarios, sequences, and processes illustrated herein. For example, software 905 may include program instructions for implementing a combined input process as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 905 may include additional processes, programs, or components, such as operating system software, virtualization software, or other application software. Software 905 may also comprise firmware or some other form of machine-readable processing instructions executable by processing system 908.

In general, software 905 may, when loaded into processing system 908 and executed, transform a suitable apparatus, system, or device (of which computing device 901 is representative) overall from a general-purpose computing system into a special-purpose computing system customized to provide enhanced content capture capabilities. Indeed, encoding software 905 on storage system 903 may transform the physical structure of storage system 903. The specific transformation of the physical structure may depend on various factors in different implementations of this description. Examples of such factors may include, but are not limited to, the technology used to implement the storage media of storage system 903 and whether the computer-storage media are characterized as primary or secondary storage, as well as other factors.

For example, if the computer readable storage media are implemented as semiconductor-based memory, software 905 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 907 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing device 901 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

User interface system 909 may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 909. In some cases, the input and output devices may be combined in a single device, such as a display capable of displaying images and receiving touch gestures. The aforementioned user input and output devices are well known in the art and need not be discussed at length here.

User interface system 909 may also include associated user interface software executable by processing system 902 in support of the various user input and output devices discussed above. Separately or in conjunction with each other and other hardware and software elements, the user interface software and user interface devices may support a graphical user interface, a natural user interface, a conversational user interface, or any other type of user interface.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. A computing apparatus comprising:
   one or more computer readable storage media;
   one or more processors operatively coupled with the one or more computer readable storage media; and
   program instructions stored on the one or more computer readable storage media that, when executed by the one or more processors, direct the computing apparatus to at least:
   display, on a display screen of the computing apparatus, a content object in a user interface to an application;
   in a multi-input mode, monitor for occurrences of combined modality inputs;
   in the multi-input mode, detect an occurrence of a combined modality input, wherein the combined modality input comprises an utterance captured via a microphone of the computing apparatus and a touch gesture sustained on the display screen of the computing apparatus with respect to the instance of the content object displayed in the user interface to the application, wherein the touch gesture occurs at least partially coincident with the utterance;
   in the multi-input mode, and in response to detecting the occurrence of the combined modality input, identify the content object associated with the touch gesture; and
   in the multi-input mode, generate a combined object comprising a transcription of a captured version of the utterance and an icon for opening the content object in the application.

2. The computing apparatus of claim 1 wherein:
   the content object comprises an email and the application comprises an email application; and
   wherein the program instructions further direct the computing apparatus to add the combined object to a view of a plurality of combined objects, wherein the plurality of combined objects includes at least one other combined object comprising a different transcription of a captured version of a different utterance and a file icon for opening a different content object in a different application than the email application.

3. The computing apparatus of claim 2 wherein:
   the different content object comprises an image and the different application comprises a photo gallery application.

4. The computing apparatus of claim 1 wherein the content object comprises an image and the application comprises a photo gallery application.

5. The computing apparatus of claim 4 wherein the program instructions further direct the computing apparatus to:
   display, on the display screen of the computing apparatus, an icon with the content object indicating that there is an associated combined object; and
   in response to a selection of the icon, display the combined object on the display screen of the computing apparatus.

6. The computing apparatus of claim 1 wherein the program instructions direct the computing apparatus to enter into the multi-input mode in response to detecting a selection of a multi-input mode option in a user interface of the computing apparatus.

7. The computing apparatus of claim 6 wherein detecting the selection of the multi-input mode comprises detecting a drag gesture made with respect to an icon associated with the multi-input mode and then detecting a dragging of the icon from an initial position to a position on a content canvas in the user interface.

8. The computing apparatus of claim 7 wherein the program instructions direct the computing apparatus to, in response to press-and-hold gestures made with respect to the icon when in the initial position, generate captured versions of utterances captured coincident with the press-and-hold gestures.

9. The computing apparatus of claim 8 wherein:
   the captured versions of the utterances comprise transcriptions of spoken words encoded in voice signals; and
   the program instructions further direct the computing apparatus to store the transcriptions of the spoken words in no association with any content objects.

10. The computing apparatus of claim 8 wherein the program instructions further direct the computing apparatus to, in response to a slide gesture made with the icon, transition the multi-input mode to a different application.

11. A method of operating a computing apparatus comprising:
    displaying, on a display screen of the computing apparatus, a content object in a user interface to an application;
    in a multi-input mode, monitoring for occurrences of combined modality inputs;
    in the multi-input mode, detecting an occurrence of a combined modality input comprising a voice signal captured via a microphone of the computing apparatus and a touch gesture sustained on the display screen of the computing apparatus with respect to the instance of the content object displayed in the user interface to the application, wherein the touch gesture occurs at least partially coincident with the voice signal;

in response to detecting the occurrence of the combined modality input, identifying the content object associated with the touch gesture; and generating a combined object comprising a transcription of a captured version of the voice signal and an icon for opening the content object in the application.

12. The method of claim 11 wherein:

the content object comprises an email and the application comprises an email application; and the method further comprises adding the combined object to a view of a plurality of combined objects, wherein the plurality of combined objects includes at least one other combined object comprising a different transcription of a captured version of a different utterance and a file icon for opening a different content object in a different application than the email application.

13. The method of claim 12 wherein: the different content object comprises an image and the different application comprises a photo gallery application.

14. The method of claim 11 wherein content object comprises an image and the application comprises a photo gallery application.

15. The method of claim 14 further comprising:

displaying, on the display screen of the computing apparatus, an icon with the content object indicating that there is an associated combined object; and in response to a selection of the icon, displaying the combined object on the display screen of the computing apparatus.

16. The method of claim 11 further comprising entering into the multi-input mode in response to detecting a selection of a multi-input mode option in a user interface of the computing apparatus.

17. The method of claim 16 wherein detecting the selection of the multi-input mode comprises detecting a drag gesture made with respect to an icon associated with the multi-input mode and detecting a dragging of the icon from an initial position to a position on a content canvas in the user interface.

18. The method of claim 17 further comprising, in response to press-and-hold gestures made with respect to the icon when in the initial position, generating captured versions of voice signals captured coincident with the press-and-hold gestures.

19. The method of claim 18 wherein the captured versions of the voice signals comprise transcriptions of utterances encoded in the voice signals and wherein the method further comprises storing the transcriptions of the utterances in no association with any content objects.

20. The method of claim 18 further comprising, in response to a slide gesture made with the icon, transitioning the multi-input mode to a different application.

21. One or more non-transitory computer readable storage media having program instructions stored thereon that, when executed by one or more processors, direct a computing device to at least:

display, on a display screen of the computing apparatus, a content object in a user interface to an application;

in a multi-input mode, monitor for occurrences of combined modality inputs;

in the multi-input mode, detect an occurrence of a combined modality input, wherein the combined modality input comprises an utterance captured via a microphone of the computing apparatus and a touch gesture sustained on the display screen of the computing apparatus with respect to the instance of the content object displayed in the user interface to the application, wherein the touch gesture occurs at least partially coincident with the utterance;

in the multi-input mode, and in response to detecting the occurrence of the combined modality input, identify the content object associated with the touch gesture; and in the multi-input mode, generate a combined object comprising a transcription of a captured version of the utterance and an icon for opening the content object in the application.

* * * * *